(No Model.)
T. H. CHUBB.
FRAME FOR LANDING NETS.
No. 422,502. Patented Mar. 4, 1890.
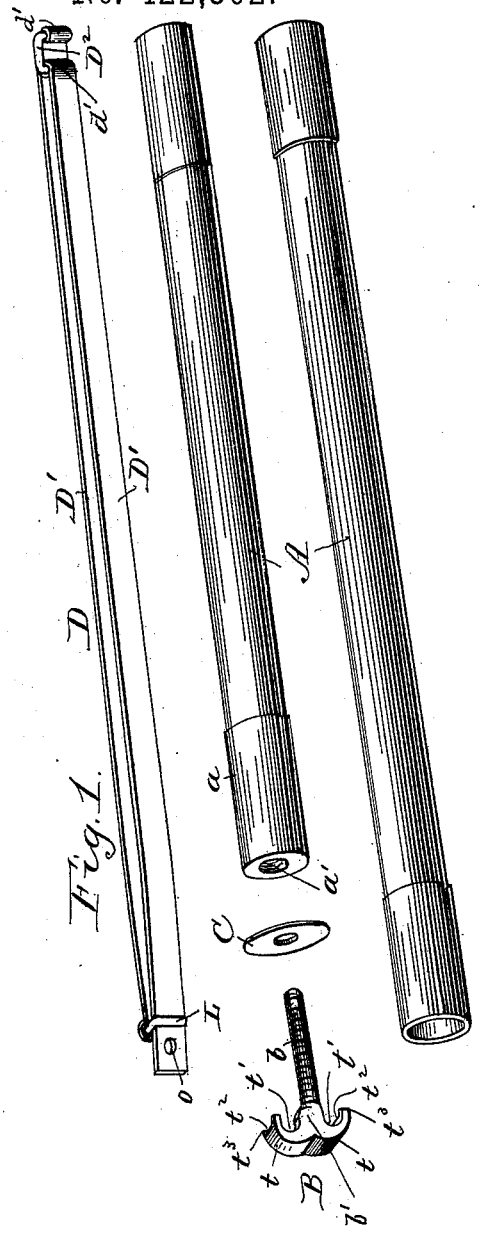
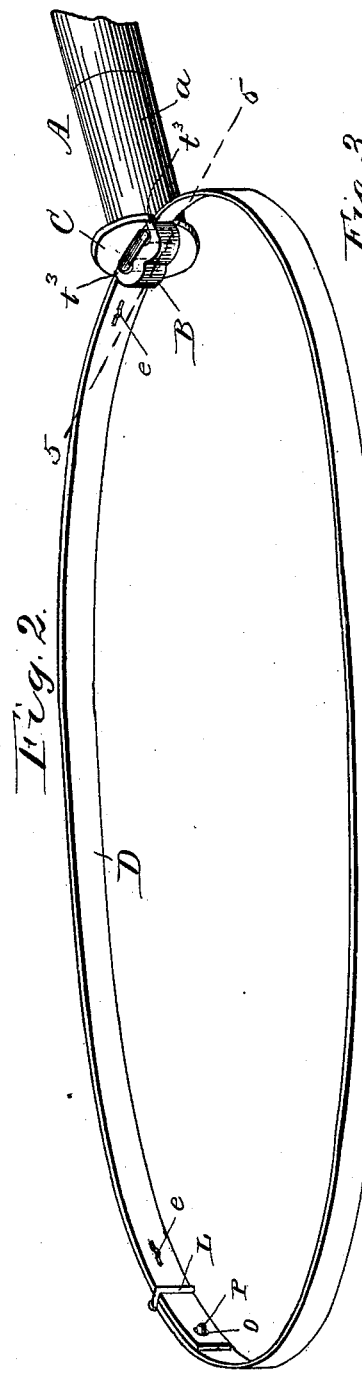
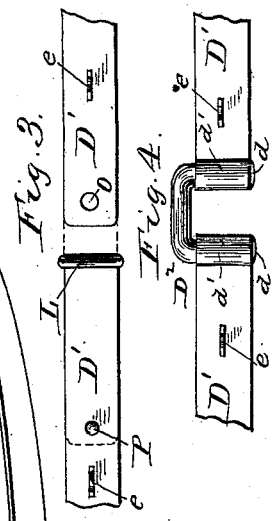
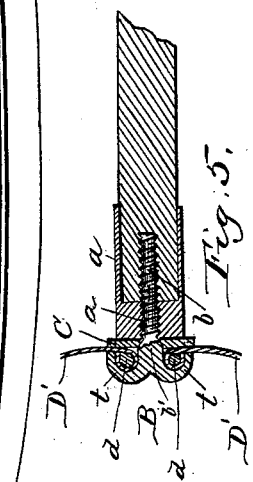
Witnesses
D. H. Curry.
E. H. Sturtevant.
Inventor
Thos. H. Chubb
By N. N. Low
Attorney
N. PETERS, Photo-Lithographer, Washington, D. C.

UNITED STATES PATENT OFFICE.

THOMAS HENRY CHUBB, OF POST MILLS, VERMONT.

FRAME FOR LANDING-NETS.

SPECIFICATION forming part of Letters Patent No. 422,502, dated March 4, 1890.

Application filed November 21, 1889. Serial No. 331,089. (No model.)

*To all whom it may concern:*

Be it known that I, THOMAS HENRY CHUBB, a citizen of the United States, residing at Post Mills, in the county of Orange and State of Vermont, have invented certain new and useful Improvements in Collapsible Frames for Landing-Nets; and I do declare the following to be a full, clear, and exact description of the invention, such as will enable others skilled in the art to which it appertains to make and use the same.

My invention relates to that class of net-frames which is especially adapted for the use of anglers, the frame being formed and jointed so that it may be readily taken apart and folded into a small compass. The net thus constructed may be conveniently carried and employed for landing fish or catching bait.

It is the object of my invention to simplify the construction of such net-frames, render them more easily and quickly put together, and adapt them to be folded into a small and compact form, making a bundle which is narrow and straight, like an unjointed rod, and can be readily packed and carried with it.

With these objects in view my invention consists in certain parts and combinations thereof, hereinafter set forth and claimed, though it will be understood that my invention can be embodied in forms other than that which, for the sake of illustration, I have shown and described.

In order to make my invention more clearly understood, I have shown in the accompanying drawings means for carrying the same into practical effect.

In said drawings, Figure 1 is a perspective view showing the parts of my net-frame separated or unassembled. Fig. 2 is a perspective view of the forward portion of the frame with the parts assembled in operative position ready for use. Fig. 3 is an inner face view of the forward side of the hoop with the ends unconnected. Fig. 4 is a similar view of the rear side of the hoop. Fig. 5 is a horizontal section on line 5 5, Fig. 2.

Referring to the drawings, A indicates the handle, which is preferably made jointed. It may consist of any desired or convenient number of parts, (two parts being shown in the drawings.) By making these parts each of a length equal to one-half the circumference of the hoop the net will fold into a very compact narrow bundle of that length. The forward end of the handle is provided with a ferrule $a$, having a screw-threaded socket $a'$.

B is a T-shaped or double hook formed with a shank $b$, threaded to fit the socket $a'$, and having on the inner face of its arms $t\ t$ vertical recesses $t'\ t'$. The rearwardly-turned ends of the arms $t$ are also provided with shallow recesses $t^2\ t^2$, which are bounded above and below by shoulders or projections $t^3\ t^3$.

C is a washer adapted to be interposed between the arms $t$ and the end of the handle A, and perforated to admit the shank $b$.

D indicates the hoop or ring, which immediately carries the net. It is composed of a plurality of strips D', of spring metal, preferably two in number. These strips are provided with means of connection whereby, when united at their ends, they will be held in a bent or hoop form; but said connecting means is of a character which permits the strips to be readily disunited, whereupon their resilience causes them to resume their straight shape, and they may be slipped with the handle-sections into a straight narrow case similar to a rod-case, or the strips D' may be placed within one of the handle-sections made hollow for the purpose. I will now describe the preferred means for uniting the said strips.

D² is a U-shaped hinge-piece provided with two legs $d\ d$, which constitute hinge-pivots for the rear ends of the strips D', which latter are bent to form cylindrical bearings $d'\ d'$, inclosing said pivots. The space between the legs of the piece D² is equal to the thickness of the outer squared portion $b'$ of the shank $b$, and the bearings $d'$ are consequently adapted to rest in the vertical recesses $t'\ t'$. The length of each recess $t^2$ is equal to the width or height of the strips D'. At their forward ends the strips are provided the one with a loop L, having an opening equal in size to the width and thickness of the other strip, and with a pin P, and the other with an opening O, adapted to receive said pin.

The parts thus constructed are assembled in the following manner: Through the loop L is passed the end of the other strip D', the strips being for this purpose bent over toward each other into a partial hoop form and the pin P is caused to enter or snap into the opening O. The strips will now be firmly united at their forward ends. The hook B is then partially unscrewed from its socket and the hinge-piece D², carrying the rear ends of the strips D', is passed over the squared portion b' of the shank b. The bearings d' are caused to enter the recesses t', and while the parts are held momentarily in this position the handle A is screwed toward the head of the hook B, to firmly clamp the bearings d' between the arms t and the washer C. Before the parts are screwed up tightly the rear ends of the strips D', if not already in place, are fitted into the recesses t² in the ends of arms t, whereby the further and final screwing together of the parts will bend the rear ends of both strips D' down into a position tangent to the washer C and cause the hoop to assume a perfectly-circular shape.

The net may be secured to the hoop in any convenient or well-known manner. It need not be removed from the strips when they are folded, but may be kept in place by securing it to eyes e, with which the strips are provided.

I claim—

1. In a landing-net frame, the combination, with the handle, of a collapsible hoop composed of a plurality of resilient strips, means for securing the outer ends of said strips together, and a clamp for connecting the rear side of the hoop detachably with the handle, said clamp having arms which engage the inner side of the hoop at two points, and said handle and clamp having a screw-connection, whereby the screwing on of the handle will gradually expand the hoop, substantially as set forth.

2. The combination of a handle having a screw-threaded socket, a collapsible hoop consisting of a plurality of resilient strips, a hinge connecting-piece uniting the rear ends of the strips, means for connecting the forward ends of the strips, and a hook having a threaded shank adapted to engage said socket and provided with a head or arms for engaging the rear side of the hoop, substantially as set forth.

3. The combination, with the handle, of the hoop having an open connecting-piece which serves as a hinge, and a headed bolt or clamp the shank of which is adapted to pass through the opening of the hinge, and means for securing said shank to the handle, substantially as set forth.

4. The hoop having one of its ends provided with the loop L and pin P and the other end provided with the aperture O, substantially as set forth, combined with a handle and a clamp, whereby the side of the hoop opposite to the connected ends is clamped to said handle, substantially as described.

In testimony whereof I affix my signature in the presence of two witnesses.

THOMAS HENRY CHUBB.

Witnesses:
E. T. HART,
C. A. POWELL.